United States Patent
Andou

(10) Patent No.: US 7,716,555 B2
(45) Date of Patent: May 11, 2010

(54) DATA BACKUP METHOD AND MEMORY DEVICE

(75) Inventor: Tomomi Andou, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 957 days.

(21) Appl. No.: 11/493,891

(22) Filed: Jul. 27, 2006

(65) Prior Publication Data

US 2007/0038918 A1    Feb. 15, 2007

(30) Foreign Application Priority Data

Jul. 29, 2005    (JP)    ................ 2005-219738

(51) Int. Cl.
    *G11C 29/00*    (2006.01)
(52) U.S. Cl. .................................... 714/766
(58) Field of Classification Search ......... 714/763–764, 714/766
See application file for complete search history.

(56) References Cited

U.S. PATENT DOCUMENTS 7,409,623 B2 *   8/2008   Baker et al. ............. 714/763
7,559,004 B1 *   7/2009   Chang et al. ............ 714/758

FOREIGN PATENT DOCUMENTS

JP    10-320301    12/1998

* cited by examiner

*Primary Examiner*—Shelly A Chase
(74) *Attorney, Agent, or Firm*—Smith, Gambrell & Russell, LLP

(57) ABSTRACT

Disclosed herein is a memory device which comprises a nonvolatile memory having first and second areas and a controller that stores backup data along with checksum data alternately in the first and second areas. In the first and second areas, data storing areas and checksum areas are respectively provided. The highest bit of checksum data stored in each of the checksum areas is used as the bit based on which the latest updated side is recognized.

5 Claims, 5 Drawing Sheets

DATA BACKUP METHOD AND MEMORY DEVICE

This application is based on Japanese Patent Application No. 2005-219738 filed on Jul. 29, 2005, the contents of which are hereby incorporated by reference.

BACKGROUND OF THE INVENTION

1. Field of the Invention

The present invention relates to a data backup method for storing data in a nonvolatile memory, and also relates to a memory device that employs the data backup method to store data in a nonvolatile memory.

2. Description of Related Art

Conventional memory devices may suffer from problems such as corruption of data stored therein resulting from, for example, the power being shut off during the writing of data to the memory. In order to prevent this, JP-A-H10-320301 has proposed providing a memory with two data-writing areas and writing data alternately thereto. This makes it possible to protect the data written in one data-writing area even if the power is shut off during the writing of data to the other data-writing area.

In the fail-safe system parameter rewriting device disclosed in JP-A-H10-320301 mentioned above, a nonvolatile memory portion is divided into side A and side B, and on each side are provided a parameter area for storing system parameters, a checksum area for storing checksum data, and a sequence counter area having a sequence counter for indicating whether the system parameters are the newer or the older.

In the fail-safe system parameter rewriting device configured as described above, when the system is started up, in order to find the latest updated side, a sum check is performed on sequence parameters on each of side A and side B. If the sum checks on the sequence parameters on both side A and side B are found to be all right, then the sequence counter value of side A and the sequence counter value of side B are compared with each other in order to find which of side A and side B is the latest updated side.

SUMMARY OF THE INVENTION

In the fail-safe system parameter rewriting device as described above, to find which is the latest updated side, each of side A and side B needs to be provided with a sequence counter area, and the sequence counter value of side A and the sequence counter value of side B need to be compared with each other. Hence, in the case of a low-capacity nonvolatile memory, a large proportion of the whole capacity thereof is occupied by the sequence counter areas, and this greatly limits the amount of data that can be stored in the nonvolatile memory. The smaller the capacity of a nonvolatile memory is, the larger proportion thereof is occupied by sequence counter areas and the more limited is the amount of data that can be stored therein.

The present invention has been made in view of the above described inconveniences, and an object of the present invention is to provide a data backup method that permits an increased amount of data to be stored in a low-capacity nonvolatile memory and a memory device that employs the data backup method to store data in a nonvolatile memory.

To achieve the above object, according to one aspect of the present invention, a memory device of the present invention is provided with: a nonvolatile memory having first and second areas; and a controller that stores backup data along with checksum data thereof alternately in the first and second areas. Here, in each of the first and second areas, in a highest bit of the checksum data, which is composed of a plurality of bits, there is stored data based on which to check which of the first and second areas is a latest updated area.

According to the present invention, in the memory device configured as described above, the controller may be provided with:
- a first checker that checks whether or not a checksum calculated from the backup data stored in the first area and the checksum data stored in the first area excluding the data in the highest bit thereof agree with each other;
- a second checker that checks whether or not a checksum calculated from the backup data stored in the second area and the checksum data stored in the second area excluding the data in the highest bit thereof agree with each other;
- a third checker that checks, when both the first and second checkers have confirmed agreement, whether or not the data stored in the highest bit of the first area and the data stored in the highest bit of the second area agree with each other; and
- a fourth checker that checks, according to a result of checking by the third checker, which of the first and second areas is a latest updated area.

According to the present invention, in the memory device configured as described above, the controller may be further provided with: a data modifier that, when updating the backup data according to a result of checking which of the first and second areas is currently a latest updated area, updates, in whichever of the first and second areas is not currently a latest updated area, the backup data with latest data and also rewrites the data stored in the highest bit.

To achieve the above object, according to another aspect of the present invention, a data backup method for storing the backup data in the nonvolatile memory of the memory device configured as described above includes:
- a step of checking whether or not a checksum calculated from the backup data stored in the first area and the checksum data stored in the first area excluding the data in the highest bit thereof agree with each other;
- a step of checking, if it is found that the checksum calculated from the backup data stored in the first area and the checksum data stored in the first area excluding data in the highest bit thereof agree with each other, whether or not a checksum calculated from the backup data stored in the second area and the checksum data stored in the second area excluding data in the highest bit thereof agree with each other;
- a step of checking, if it is found that the checksum calculated from the backup data stored in the second area and the checksum data stored in the second area excluding data in the highest bit thereof agree with each other, whether or not the data in the highest bit of the first area and the data in the highest bit of the second area agree with each other; and
- a step of checking which of the first and second areas is a latest updated area according to a result of checking whether or not the data stored in the highest bit of the first area and the data stored in the highest bit of the second area agree with each other.

According to the present invention, the data backup method structured as described above may further include a step of, when updating data according to the result of checking which of the first and second areas is currently a latest updated area, updating, in whichever of the first and second areas is not currently a latest updated area, the backup data and also rewriting the data stored in the highest bit.

According to the present invention, since the data based on which to check which of the first and second areas is the latest updated side (latest updated area) is stored in the highest bit of checksum data which is composed of a plurality of bits, there is no need to provide either of the first and the second area with an extra area for storing the data based on which to check the latest updated side. Hence, according to the present invention, since the data based on which to check the latest updated side can be stored in a vacant space already existing in each of the first and second areas in the nonvolatile memory, the capacity of the nonvolatile memory can be reduced as much as the capacity occupied by the extra areas conventionally needed for storing the data based on which to check the latest updated side.

DETAILED DESCRIPTION OF PREFERRED EMBODIMENTS

Hereinafter, an embodiment of the present invention will be described in detail with reference to the accompanying drawings.

Figure 1:
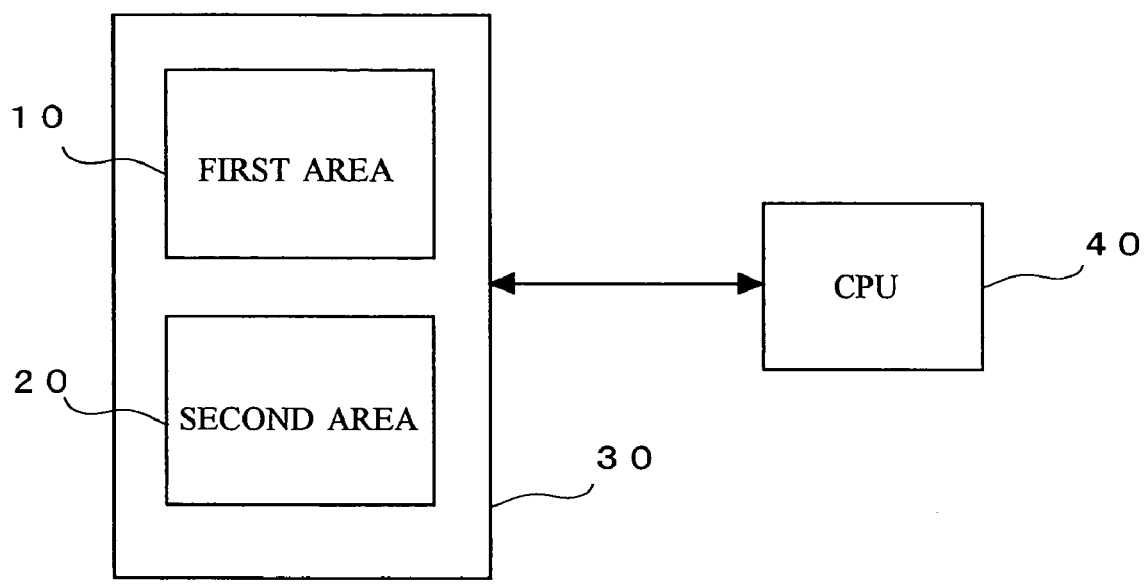
FIG. 1 is a block diagram showing the configuration of a memory device embodying the present invention.

As shown in FIG. 1, in this embodiment, a memory device is provided with: a nonvolatile memory 30 (which is here assumed to be an EEPROM 30) having a first and a second area 10 and 20 as data storage areas; and a central processing unit (controller) 40 (hereinafter referred to as the CPU 40) that reads data from, writes data to, and checks data in each of the first and second areas 10 and 20 of the EEPROM 30.

In the memory device configured as described above, as shown in FIG. 2, the first area 10 of the EEPROM 30 is composed of a data storage area 11 and a checksum area 12. In the data storage area 11, there are stored 13 pieces of one-byte data, namely data 1-1 to 1-13. In the checksum area 12, two-byte first checksum data is stored. In the checksum area 12, the highest bit thereof is used as a first latest-updated-side checking bit (indicated by hatching in FIG. 2) for storing data based on which to check the latest-updated-side, and the other 15 bits are used for storing the checksum data of data 1-1 to 1-13.

Figure 2:
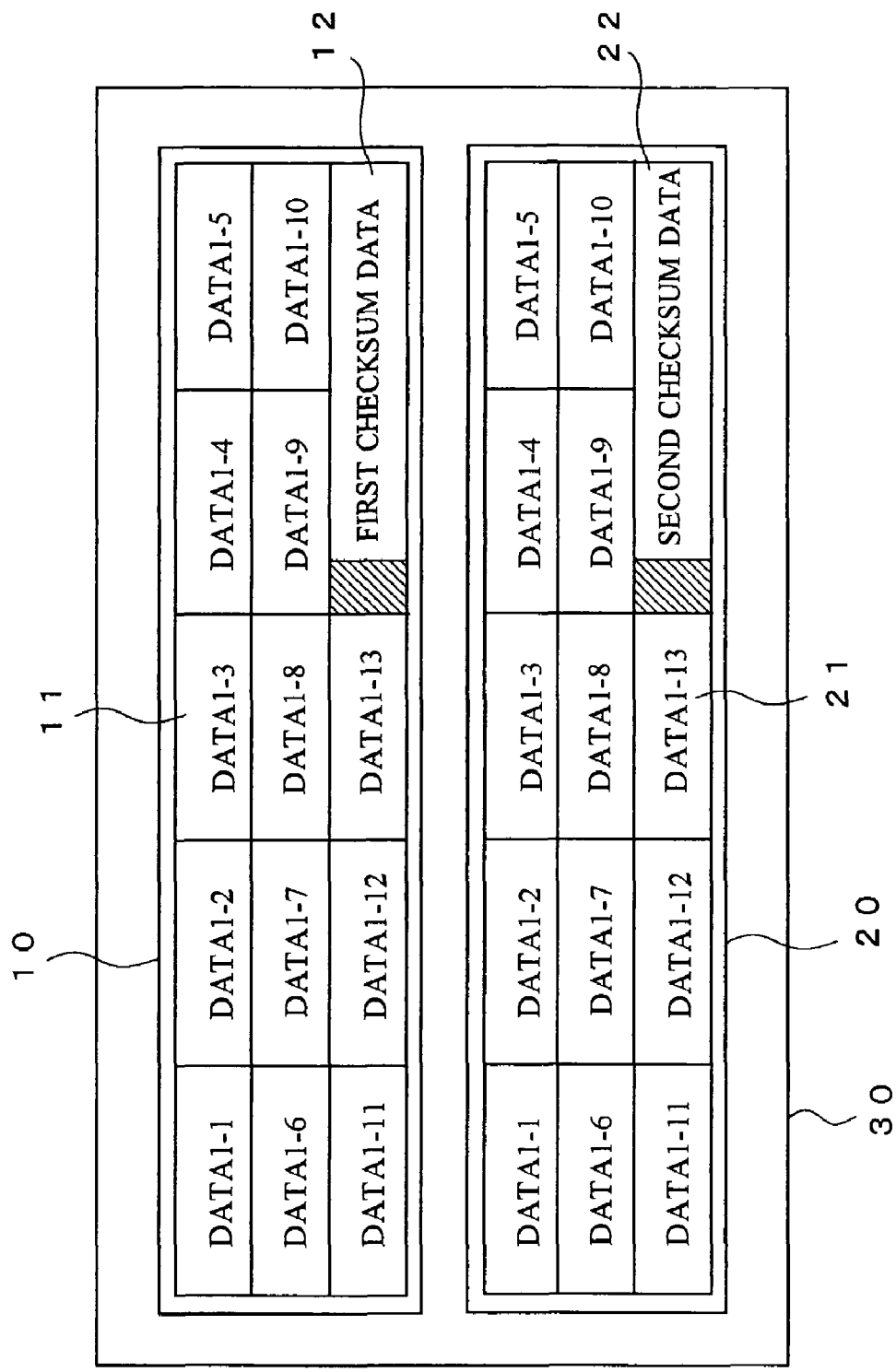
FIG. 2 is a diagram showing the configuration of a nonvolatile memory used in the memory device embodying the present invention.

Although FIG. 2 shows a case in which 13 pieces of data (data 1-1 to 1-13) are stored in the data storage area 11 of the first area 10, less or more than 13 pieces of data may be stored in the data storage area 11.

Likewise, as shown in FIG. 2, the second area 20 of the EEPROM 30 is composed of a data storage area 21 and a checksum area 22. In the data storage area 21, there are stored 13 pieces of one-byte data, namely data 2-1 to 2-13. In the checksum area 22, two-byte second checksum data is stored. In the checksum area 22, the highest bit thereof is used as a second latest-updated-side checking bit (indicated by hatching in FIG. 2) for storing data based on which to check the latest-updated side, and the other 15 bits are used for storing the checksum data of data 2-1 to 2-13.

Although FIG. 2 shows a case in which 13 pieces of data (data 2-1 to 2-13) are stored in the data storage area 21 of the second area 20, less or more than 13 pieces of data may be stored in the data storage area 21.

In this memory device, when the power to the memory device is turned on, the data stored in the EEPROM 30 is read, and it is checked which of the first and the second areas 10 and 20 has the latest updated data (that is, which of the first and the second areas 10 and 20 is the latest updated side). Now, how this checking is performed will be described with reference to the flow chart shown in FIG. 3. Incidentally, other than when the power to the memory device is turned on, whenever the data stored in the EEPROM 30 is read, the CPU 40 carries out the procedure shown in FIG. 3.

First, when the power to the memory device is turned on (step S11), the CPU 40 reads data 1-1 to 1-13 and the first checksum data from the first area 10 of the EEPROM 30. Then, the CPU 40 adds up data 1-1 to 1-13 and checks whether or not the thus added-up data and the first checksum data with the highest bit thereof masked agree with each other (step S12).

At this time, if the CPU 40 confirms agreement between the data obtained by adding up data 1-1 to 1-13 and the first checksum data with the highest bit thereof masked (step S12, Yes), then, the CPU 40 reads data 2-1 to 2-13 and the second checksum data from the second area 20 of the EEPROM 30. Then, the CPU 40 adds up data 2-1 to 2-13 and checks whether or not the thus added-up data and the second checksum data with the highest bit thereof masked agree with each other (step S13).

On the other hand, if the CPU 40 confirms disagreement between the data obtained by adding up data 1-1 to 1-13 and the first checksum data with the highest bit thereof masked (step S12, No), then the CPU 40 reads data 2-1 to 2-13 and the second checksum data from the second area 20 of the EEPROM 30. Then, the CPU 40 adds up data 2-1 to 2-13 and checks whether or not the thus added-up data and the second checksum data with the highest bit thereof masked agree with each other (step S14).

If the CPU 40 confirms agreement between the data obtained by adding up data 2-1 to 2-13 and the second checksum data with the highest bit thereof masked agree with each other (step S14, Yes), the CPU 40 finds the data stored in the second area 20 to be the latest updated data (step S15), and hence the data to be used in further processing.

If, in step S13, the CPU 40 confirms agreement between the data obtained by adding up data 2-1 to 2-13 and the second checksum data with the highest bit thereof masked (step S13, Yes), the CPU 40 next checks whether or not the first latest-updated-side checking bit located in the highest bit of the first checksum data and the second latest-updated-side checking bit located in the highest bit of the second checksum data agree with each other (step S16).

At this time, if the CPU 40 confirms agreement between the first and the second latest-updated-side checking bits (step S16, Yes), the CPU 40 finds the data stored in the first area 10 to be the latest updated data (step S17), and hence the data to be used in further processing. On the other hand, if the CPU 40 confirms disagreement between the first and the second latest-updated-side checking bits (step S16, No), the CPU 40 finds the data stored in the second area 20 to be the latest updated data (step S15), and hence the data to be used in further processing.

If, in step S13, the CPU 40 confirms disagreement between the data obtained by adding up data 2-1 to 2-13 and the second checksum data with the highest bit thereof masked (step S13, No), the CPU 40 finds the data stored in the first area 10 to be the latest updated data (step S17), and hence the data is to be used in further processing.

If, in step S14, the CPU 40 confirms disagreement between the data obtained by adding up data 2-1 to 2-13 and the second checksum data with the highest bit thereof masked (step S14, No), the CPU 40 proceeds to predetermined error handling (step S18).

The error handling here may be, for example: replacing the data stored in the first or second area 10 or 20 of the EEPROM 30 with initial data previously stored in the memory device so that the initial data will be used in further processing; or notifying the higher-level device connected to the memory device of the error so that the error is indicated on a display portion (unillustrated) of the higher-level device and that the operation of the whole system including the memory device and the higher-level device is stopped.

Alternatively, unless the CPU 40 finds the damage to the data stored in the first or second area 10 or 20 serious enough to affect the whole system, the data stored in one of the first and second areas 10 and 20 may be used as it is in further processing. This alternative is chosen, for example, in a case where the data regarding the settings of the higher-level device is stored in the first or second area 10 or 20 of the EEPROM 30 and starting up the higher-level device with that data, even if it is damaged, only results in minor changes in the settings without causing serious inconveniences to the user.

In this memory device, the CPU 40 writes data to the first or second area 10 or 20 of the EEPROM 30. Now, how this writing of data is performed will be described with reference to the flow chart shown in FIG. 4.

First, if the CPU 40 recognizes a need to write data to the EEPROM 30 (step S21, Yes), then the CPU 40 checks which of the first and second areas 10 and 20 of the EEPROM 30 is currently the latest updated side (step S22). At this time, if the CPU 40 recognizes the second area 20 to be currently the latest updated side (step S22, Yes), the CPU 40 writes the latest data to the data storage area 11 of the first area 10 to make the first area 10 the latest updated side (step S23). Then, the CPU 40 adds up data 1-1 to 1-13 stored in the data storage area 11 of the first area 10, makes the first latest-updated-side checking bit equal to the second latest-updated-side checking bit, and writes the resulting data as the first checksum data to the checksum area 12 (step S24).

On the other hand, at this time, if the CPU 40 recognizes the second area 20 not to be currently the latest-updated side (step S22, No), that is, if the CPU 40 recognizes the first area 10 to be currently the latest updated side, the CPU 40 writes the latest data to the data storage area 21 of the second area 20 to make the second area 20 the latest updated side (step S25). Then, the CPU 40 adds up data 2-1 to 2-13 stored in the data storage area 21 of the second area 20, inverts the second latest-updated-side checking bit with respect to the first latest-updated-side checking bit, and writes the resulting data as the second checksum data to the checksum area 22 (step S26).

Figure 3:
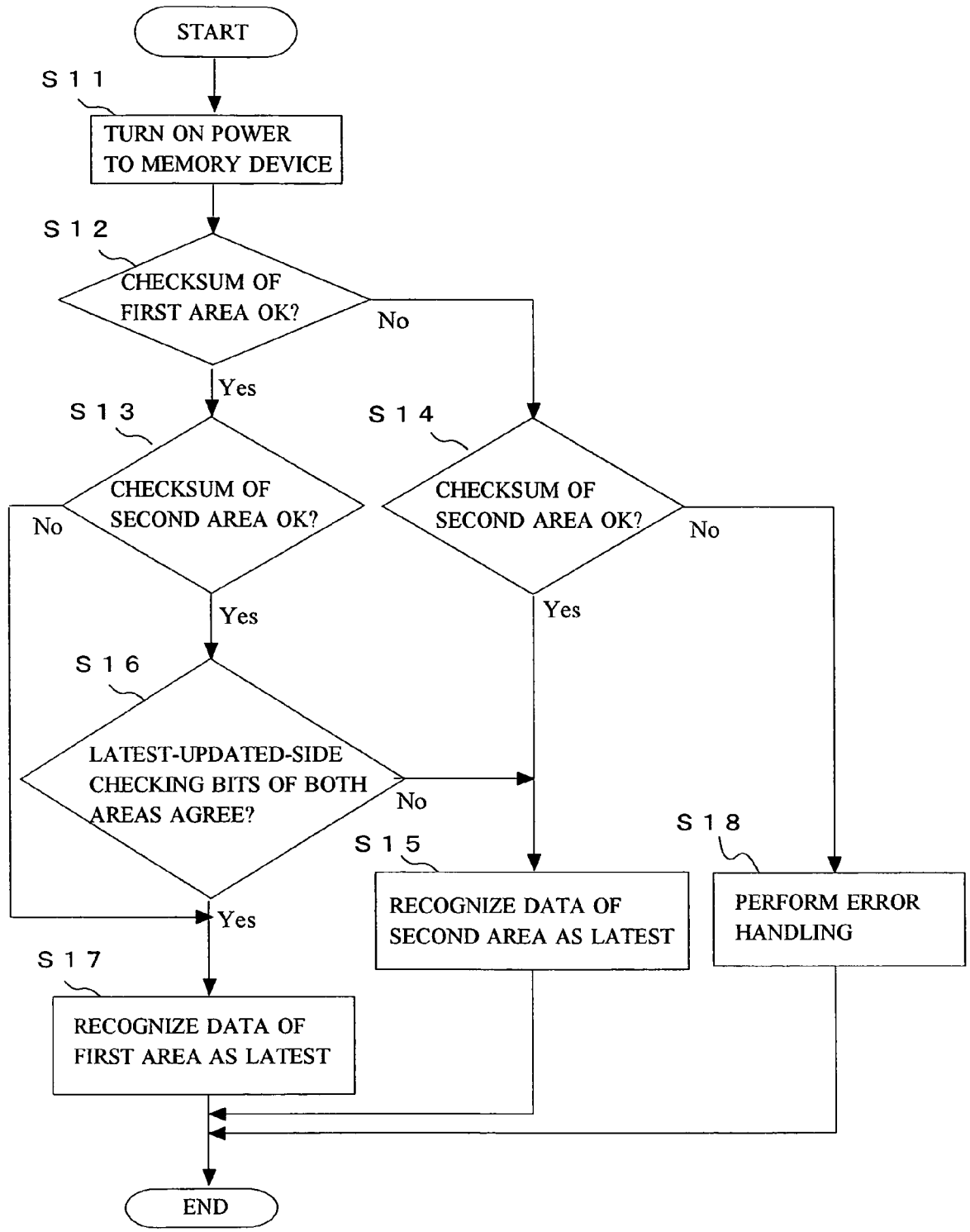
FIG. 3 is a flow chart showing how a CPU operates when it reads data stored in the nonvolatile memory.

In step S15 or S17 in the flow chart shown in FIG. 3, the CPU 40 checks which of the first and second areas 10 and 20 contains the latest updated data. Then, in step S22 in the flow chart shown in FIG. 4, the CPU 40 checks, according to the result of the just-mentioned checking, which of the first and second areas 10 and 20 of the EEPROM 30 is currently the latest updated side.

Figure 4:
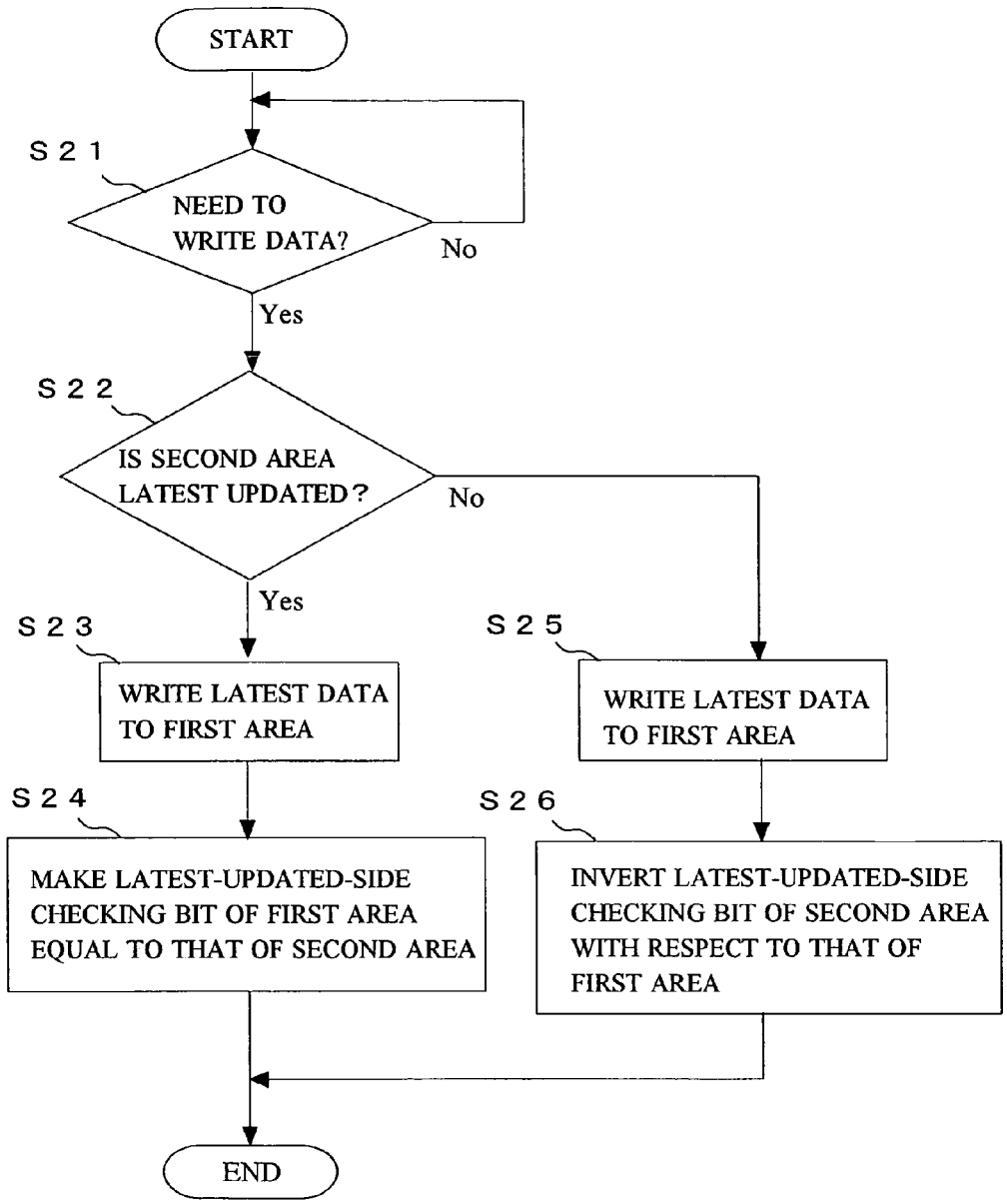
FIG. 4 is a flow chart showing how the CPU operates when it writes data to the nonvolatile memory.

In step S24 in the flow chart shown in FIG. 4, the CPU 40 makes the first latest-updated-side checking bit equal to the second latest-updated-side checking bit, and thus in the flow chart shown in FIG. 3, the CPU 40 confirms agreement between the first latest-updated-side checking bit and the second latest-updated-side checking bit (step S16, Yes) so as to find that the first area 10 of the EEPROM 30 contains the latest updated data (step S17).

In step S26 in the flow chart shown in FIG. 4, the CPU 40 inverts the second latest-updated-side checking bit with respect to the first latest-updated-side checking bit, and thus in the flow chart shown in FIG. 3, the CPU 40 confirms disagreement between the first latest-updated-side checking bit and the second latest-updated-side checking bit (step S16, No) so as to find that the second area 20 of the EEPROM 30 contains the latest updated data (step S15).

As described above, if, when data is read from the EEPROM 30, the CPU 40 finds the first area of the EEPROM 30 to contain the latest updated data in step S17 in the flow chart shown in FIG. 3, the CPU 40, when data is written to the EEPROM 30, recognizes the first area 10 to be currently the latest updated side in step S22 in the flow chart shown in FIG. 4, and then the CPU 40 inverts the second latest-updated-side checking bit with respect to the first latest-updated-side checking bit (step S26).

Subsequently, when data is read from the EEPROM 30, since the first latest-updated-side checking bit and the second latest-updated-side checking bit disagree with each other, in step S15 in the flow chart shown in FIG. 3, the CPU 40 finds the second area 20 of the EEPROM 30 to contain the latest updated data. Hence, when data is written to the EEPROM 30, in step S22 in the flow chart shown in FIG. 4, the CPU 40 recognizes the second area 20 to be the current latest updated area, and then makes the first and the second latest-updated-side checking bit equal to each other (step S24). In this way, the latest data is written alternately to the data storage area 11 of the first area 10 and the data storage area 21 of the second area 20 of the EEPROM 30.

Incidentally, in the first or second area 10 or 20 of the EEPROM 30, when the highest bit of the checksum data stored in the checksum area 12 or 22 is used as a latest-updated-side checking bit, the probability of the checksum data stored in the checksum area 12 or 22 and the checksum data calculated by the CPU 40 agreeing with each other despite actually the data stored in the data storage area 11 or 21 being wrong is twice as high as when all the bits of the checksum area 12 or 22 are used for storing checksum data.

However, in a low-capacity EEPROM 30 as shown in FIG. 2, storing the checksum data rarely requires all the bits of a checksum area 12 or 22 of a first or second area 10 or 12. Specifically, in a low-capacity EEPROM 30 having a first area 10 and a second area 20 of which each can store data of about 128 bytes, the bits used for storing checksum data are, as counted from the lowest bit up, the first (lowest) bit to the 15th (second highest) bit among a total of 16 bits. Hence, even when the highest bit of the checksum data stored in the checksum area 12 or 22 are used as a latest-updated-side checking bit, the probability of the checksum data stored in the checksum area 12 or 22 and the checksum calculated by the CPU 40 agreeing with each other despite actually the data stored in the data storage areas 11 or 21 being wrong remains unchanged.

Figure 5:
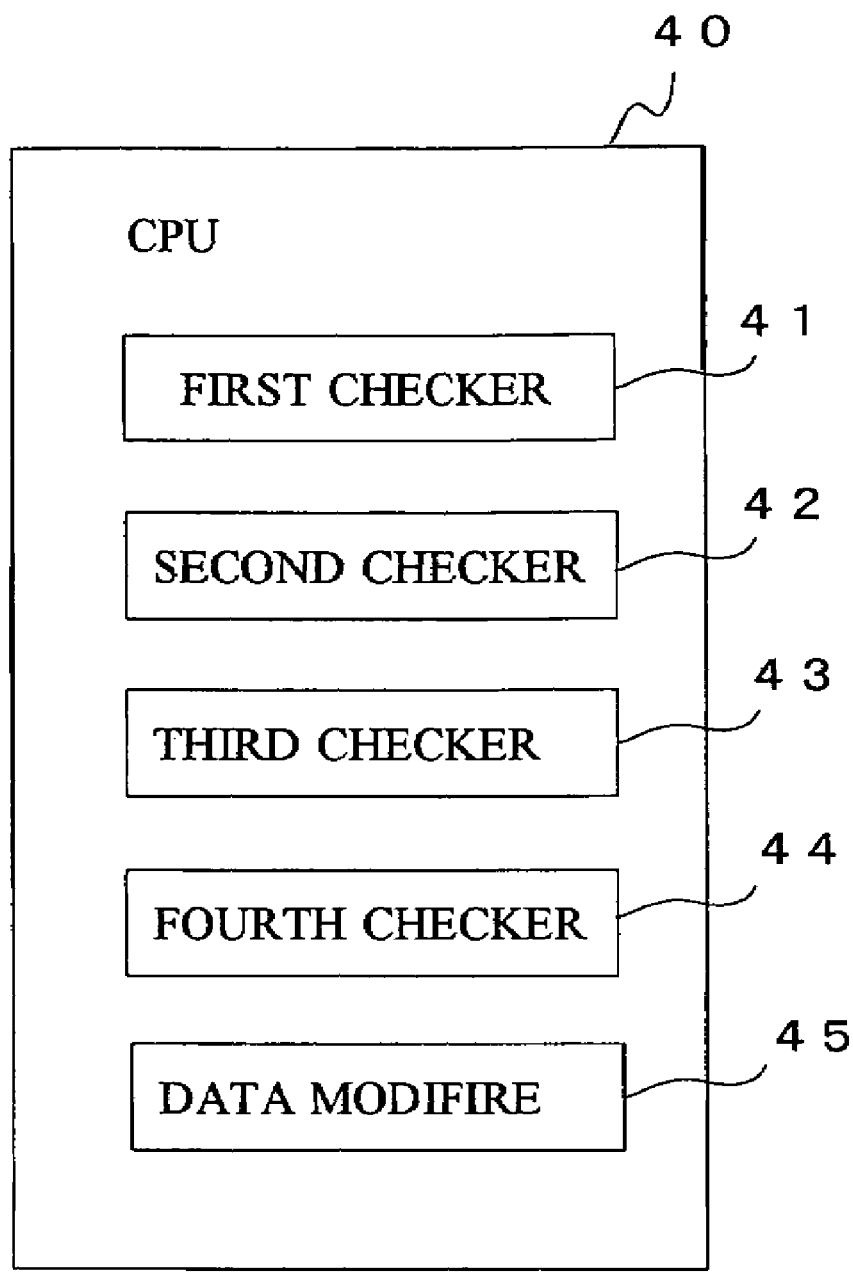
FIG. 5 is a block diagram showing the configuration of the CPU provided in the memory device.

FIG. 5 is a block diagram showing the configuration of the CPU 40, and as shown in FIG. 5, the CPU 40 is provided with a first checker 41, a second checker 42, a third checker 43, a fourth checker 44, and a data modifier 45.

The first checker 41, in step S12, adds up data 1-1 to 1-13 so as to check whether or not the thus added-up data and the first checksum data with the highest bit thereof masked agree with each other; the second checker 42, in step S14, adds up data 2-1 to 2-13 so as to check whether or not the thus added-up data and the second checksum data with the highest bit thereof masked agree with each other.

The third checker 43, in step S16, checks whether or not the data of the first latest-updated-side checking bit located at the highest bit of the first checksum data and the data of the second latest-updated-side checking bit located at the highest bit of the second checksum data agree with each other. The fourth checker 44, in step S15 or S17, checks which of the first and second areas 10 and 20 is the latest updated area (latest updated side).

The data modifier 45, in steps S23 and S24, or in steps S 25 and S26, updates the data stored in the data storage areas 11 and 21 with the latest data, and modifies the data in the highest bit of the first or second area 10 or 20.

According to the embodiment, since the data based on which to check which of the first and second areas 10 and 20 is the latest-updated side is stored in the highest bit of the checksum data which is composed of 16 bits, there is no need to provide each of the first and second areas 20 with an extra area for storing the data based on which to check the latest updated side. Hence, according to the embodiment, since the data based on which to check the latest updated side is stored in a vacant space already existing in each of the first and second areas 10 and 20 of the EEPROM 30, the capacity of the EEPROM 30 can be reduced as much as the capacity occupied by the extra areas conventionally needed for storing the data based on which to check the latest updated side.

Furthermore, according to the embodiment, even when the capacity of the EEPROM 30 is reduced, it is still possible to check which of the first and second areas 10 and 20 is the latest updated side and to check errors in the data stored in each of the first and second areas 10 and 20. Thus, according to the embodiment, it is possible to provide a memory device capable of high-performance processing despite having a small-capacity EEPROM 30.

As has been discussed above, the present invention is useful in memory devices that store data in a nonvolatile memory by using a data backup method for storing data in a nonvolatile memory.

What is claimed is:

1. A memory device comprising:
a nonvolatile memory having first and second areas; and
a controller that stores backup data along with checksum data thereof alternately in the first and second areas,
wherein,
a checksum area is provided in each of the first and second areas, and
checksum data is stored in the checksum area in a data format in which a highest bit thereof is used for storing data based on which to check which of the first and second areas is a latest updated area, and bits thereof other than the highest bit are used for storing the checksum data.

2. The memory device of claim 1,
wherein the controller comprises:
a first checker that checks whether or not a checksum calculated from the backup data stored in the first area and data stored in the checksum area of the first area excluding the data in the highest bit thereof agree with each other;
a second checker that checks whether or not a checksum calculated from the backup data stored in the second area and data stored in the checksum area of the second area excluding the data in the highest bit thereof agree with each other;
a third checker that checks, when both the first and second checkers have confirmed agreement, whether or not the data stored in the highest bit of the first area and the data stored in the highest bit of the second area agree with each other; and
a fourth checker that checks, according to a result of checking by the third checker, which of the first and second areas is a latest updated area.

3. The memory device of claim 2,
wherein the controller further comprises:
a data modifier that, when updating the backup data according to a result of checking which of the first and second areas is currently a latest updated area, updates, in whichever of the first and second areas is not currently a latest updated area, the backup data with latest data and also rewrites the data stored in the highest bit.

4. A data backup method for a memory device comprising a nonvolatile memory having first and second areas and a controller that stores backup data along with checksum data thereof alternately in the first and second areas, a checksum area being provided in each of the first and second areas, and the checksum data being stored in the checksum area in a data format in which a highest bit of the checksum data is used for storing data based on which to check which of the first and second areas is a latest updated area, and bits of the checksum data other than the highest bit are used for storing the checksum data,
the method comprising:
a step of checking whether or not a checksum calculated from the backup data stored in the first area and data stored in the checksum area of the first area excluding the data in the highest bit thereof agree with each other;
a step of checking, if it is found that the checksum calculated from the backup data stored in the first area and the data stored in the checksum area of the first area excluding data in the highest bit thereof agree with each other, whether or not a checksum calculated from the backup data stored in the second area and data stored in the checksum area of the second area excluding data in the highest bit thereof agree with each other;
a step of checking, if it is found that the checksum calculated from the backup data stored in the second area and the data stored in the checksum area of the second area excluding data in the highest bit thereof agree with each other, whether or not the data in the highest bit of the first area and the data in the highest bit of the second area agree with each other; and
a step of checking which of the first and second areas is a latest updated area according to a result of checking whether or not the data stored in the highest bit of the first area and the data stored in the highest bit of the second area agree with each other.

5. The data backup method of claim 4, further comprising:
a step of, when updating data according to the result of checking which of the first and second areas is currently a latest updated area, updating, in whichever of the first and second areas is not currently a latest updated area, the backup data and also rewriting the data stored in the highest bit.

* * * * *